US008844778B2

(12) United States Patent
St. Georges

(10) Patent No.: US 8,844,778 B2
(45) Date of Patent: Sep. 30, 2014

(54) ADAPTER BRACKET FOR SUPPORTING A SADDLE BAG ON A MOTORCYCLE AND METHOD FOR INSTALLING SAME

(75) Inventor: Aimee St. Georges, Lockeford, CA (US)

(73) Assignee: The Leatherworks, Inc., Stockton, CA (US)

( * ) Notice: Subject to any disclaimer, the term of this patent is extended or adjusted under 35 U.S.C. 154(b) by 75 days.

(21) Appl. No.: 13/594,832

(22) Filed: Aug. 26, 2012

(65) Prior Publication Data
US 2013/0068812 A1 Mar. 21, 2013

Related U.S. Application Data

(60) Provisional application No. 61/537,519, filed on Sep. 21, 2011.

(51) Int. Cl.
*B62J 7/08* (2006.01)
*B62J 9/00* (2006.01)
*B62J 7/04* (2006.01)
*B62J 11/00* (2006.01)
*B60R 7/00* (2006.01)

(52) U.S. Cl.
CPC .......................................... *B62J 9/00* (2013.01)
USPC ........... 224/413; 224/459; 224/460; 224/429; 224/547; 224/407; D12/407

(58) Field of Classification Search
CPC .............. B62J 9/008; B62J 7/08; B62J 9/001; B62J 9/00; B62J 7/04; A45C 2003/005; B60R 2011/008
USPC ................. 224/459, 430, 429, 547, 413, 407; D12/407
See application file for complete search history.

(56) References Cited

U.S. PATENT DOCUMENTS

| | | | |
|---|---|---|---|
| 2,423,003 A * | 6/1947 | Buegeleisen | 224/423 |
| 4,096,980 A * | 6/1978 | Clow | 224/441 |
| 4,258,869 A | 3/1981 | Hilgendorff | |
| 4,260,084 A | 4/1981 | Warren, Jr. | |
| 4,266,703 A * | 5/1981 | Litz | 224/443 |
| 4,580,706 A * | 4/1986 | Jackson et al. | 224/427 |
| D394,632 S | 5/1998 | Miller | |
| D398,283 S | 9/1998 | Miller | |
| 6,053,384 A | 4/2000 | Bachman | |
| 6,223,960 B1 | 5/2001 | Powell et al. | |
| 6,293,450 B1 * | 9/2001 | Aron | 224/430 |
| 6,378,643 B1 * | 4/2002 | Galbraith et al. | 180/219 |
| 6,499,638 B2 | 12/2002 | Campbell | |

(Continued)

*Primary Examiner* — Brian D Nash
*Assistant Examiner* — Derek Battisti
(74) *Attorney, Agent, or Firm* — R. Michael West

(57) ABSTRACT

An adapter bracket for supporting a saddle bag on a motorcycle. A strut for securing a rear motorcycle fender includes a vertical section, a lower horizontal section, and an upper horizontal section. The vertical section has bolts extending through it for attachment to the fender. The adapter bracket includes a lower attachment portion with bores, an intermediate strut coupling portion, and an upper connection plate with an aperture. One of the fender bolts is removed, and the coupling portion is slid over the lower horizontal section of the strut from the strut's inner side. The aperture in the connection plate is aligned with the hole in the strut corresponding to the removed bolt. The bolt is reinstalled, securing the strut, bracket, and fender together. An inner sidewall of the saddle bag provided with a backing plate, and bolts secure the backing plate, the inner sidewall, and the attachment portion together.

13 Claims, 4 Drawing Sheets

(56) References Cited

U.S. PATENT DOCUMENTS

| | | | |
|---|---|---|---|
| 6,520,275 B2* | 2/2003 | Galbraith et al. | 180/219 |
| 6,830,169 B1 | 12/2004 | Campbell | |
| 8,028,877 B2* | 10/2011 | Lien | 224/417 |
| 8,172,188 B2* | 5/2012 | Dubinskiy et al. | 248/214 |
| 2004/0232183 A1* | 11/2004 | Watanabe et al. | 224/413 |
| 2005/0150921 A1* | 7/2005 | Schneider | 224/413 |
| 2010/0012695 A1* | 1/2010 | DeMilio | 224/413 |

* cited by examiner

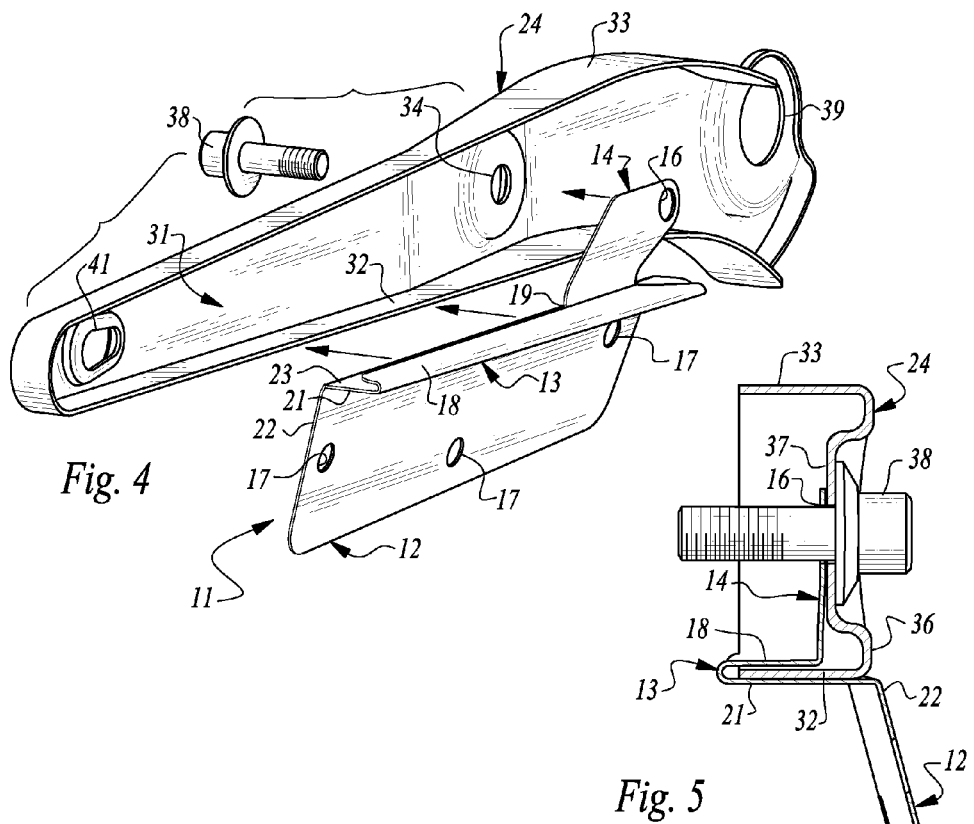
*Fig. 4*
*Fig. 5*
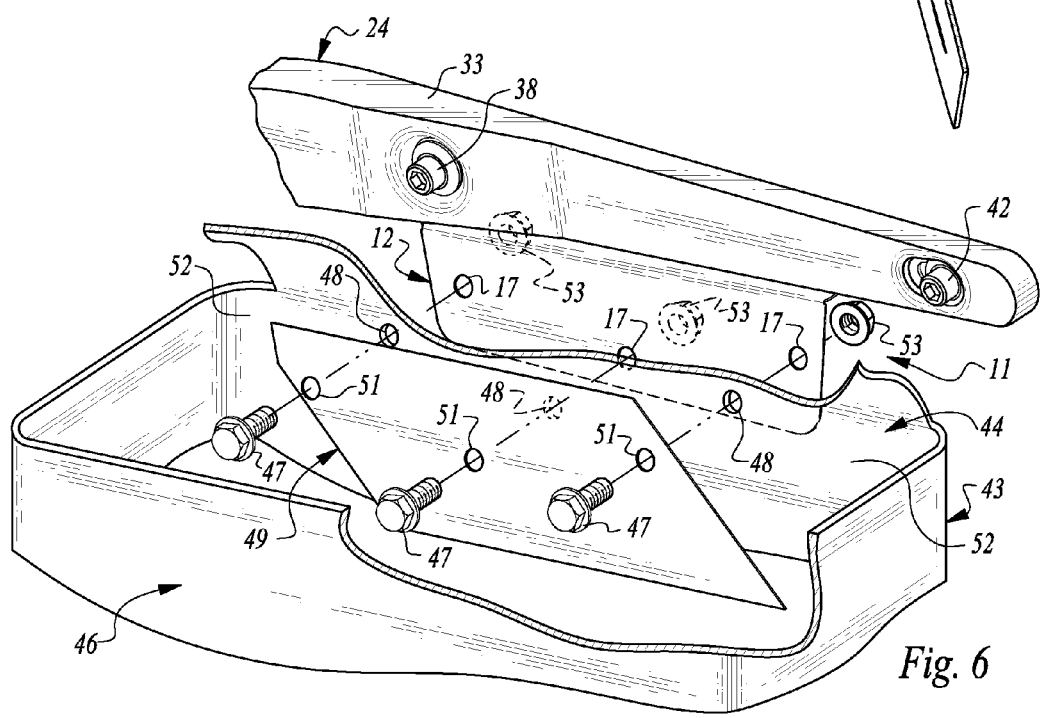
*Fig. 6*

ADAPTER BRACKET FOR SUPPORTING A SADDLE BAG ON A MOTORCYCLE AND METHOD FOR INSTALLING SAME

PRIORITY CLAIM

Pursuant to the provisions of 35 U.S.C. §119(e)(1), Applicant claims the priority of: U.S. Provisional Patent Application Ser. No. 61/537,519 filed Sep. 21, 2011.

BACKGROUND OF THE INVENTION

1. Field of the Invention

The invention relates generally to improvements in apparatus and methods for attaching saddle bags to motorcycles. More particularly, the invention pertains to an adaptive system, employing an adapter bracket which couples to and utilizes existing motorcycle structure to support a saddle bag. The invention also pertains to a method for installing the adapter bracket and the saddle bag without modification to the existing structure of the motorcycle.

2. Description of the Prior Art

Owing to their limited carrying capacity, motorcycles present a unique challenge for those needing to stow clothes, personal items, food, tools, spare parts and the like, while underway. U.S. Pat. No. 4,258,869, issued to Hilgendorff, shows a saddle pack arrangement. Having a pair of saddle packs on either side connected by a flexible support web, this device is claimed to be useful to carry personal items on horses, snowmobiles, and motorcycles (FIGS. 3-5).

Another saddlebag construction, more uniquely adapted for motorcycles, is shown in U.S. Pat. No. 4,580,706, granted to Jackson, et al. The front portions of the saddlebags are connected to the frame by straps (FIG. 1), and the rear portions of the saddlebags include connector straps 112 and 116 to secure the two bags together (FIG. 2). The saddle pack or saddlebag approach is useful where one wants to remove the conjoined bags after a destination is reached, so they can be hand carried as luggage.

Individual bags, or pieces of luggage, designed to be detachably fixed to a motorcycle are also well represented in the prior art. One example, shown in U.S. Pat. No. 4,260,084, issued to Warren, Jr., comprises a piece of luggage including a protruding structure which is adapted to be moved into a recess formed in a corresponding frame, mounted on a motorcycle. (See, e.g. FIGS. 2 and 3).

A further example of motorcycle luggage is depicted in U.S. Pat. No. 6,499,638, granted to Campbell. The luggage is in the form of a saddle bag, which can be attached to and detached from, a mounting plate secured to the frame of a motorcycle.

Yet another example of motorcycle luggage is shown in U.S. Pat. No. 6,830,169, issued to Campbell for a quick release saddlebag mounting system. This arrangement includes two mounting assemblies, two mounting brackets, and two mounting bolts. To secure the saddlebag to the motorcycle, a cam in each mounting assembly is rotated until the cam engages a cam spindle. The reverse process frees the saddlebag for removal from the motorcycle for use as conventional luggage.

Another mounting system for motorcycle saddle bags is illustrated in U.S. Pat. No. 6,053,384 to Bachman. This mounting system relies upon two spool-like keepers, having respective bolt portions passing through existing holes in a fender strut of a motorcycle.

Lastly, a fully adjustable bracket for a removable and stationary saddlebag support system is shown in U.S. Pat. No. 8,172,188 to Dubinskiy, et al. This construction also uses a pair of cylindrical keepers, but includes a bracket assembly with adjustable engaging portions for slidable engagement with the pair of keepers.

Notwithstanding the foregoing prior art, the need exists for a mounting system for motorcycle saddlebags, which is quick and easy to mount on a motorcycle by using pre-existing structure and hardware.

It is further an object of the apparatus disclosed herein to provide an adaptive system for supporting a saddle bag on a motorcycle, which does not require either drilling or any other permanent modification of the existing structure of the motorcycle for mounting the saddlebag.

It is also an object herein to disclose an adapter bracket and a saddle bag that is securely mounted to a motorcycle using a single pre-existing hole in a rear fender strut and a single pre-existing rear fender bolt.

It is also an object herein to teach an adapter bracket for supporting a saddle bag on a motorcycle, and method for installing same, which are easily implemented and do not deface or modify the rear fender strut.

These and other objects will become apparent in the specification and the detailed description of the preferred embodiment, to follow.

SUMMARY OF THE INVENTION

An adapter bracket is disclosed for supporting motorcycle saddle bags by utilizing an existing rear fender strut. The rear fender strut extends horizontally and rearwardly from the motorcycle frame, for the purpose of securing and maintaining the rear motorcycle fender in place. A vertical section of the rear strut has at least two fender bolts extending through it for attachment to the fender. It is only necessary to remove one of these bolts to install the adapter bracket of the present invention.

The adapter bracket includes a lower attachment portion with bores, an intermediate strut coupling portion, and an upper connection plate with an aperture. One of the strut fender bolts is removed, and the strut coupling portion of the adapter bracket is slid over a lower horizontal section of the strut from the strut's inner side. The coupling portion substantially surrounds the upper and lower faces of the lower horizontal section, making a snug fit therearound.

The upper connection plate is in contingent relation with an inner face of the vertical section of the strut. The aperture in the upper connection plate is aligned with the fender bolt hole in the strut corresponding to the removed bolt. The fender bolt is then reinstalled through the bolt hole, securing the connection plate of the adapter bracket between the inner face of the strut and the bolt attachment portion of the rear fender.

The lower attachment portion of the bracket extends outwardly and downwardly at an angle from the lower, outer edge of the strut. An inner sidewall of the saddle bag to be installed is pre-drilled or pre-punched with bores, corresponding in number and pattern with the bores in the lower attachment portion of the adapter bracket. The inner sidewall of the saddle bag is preferably provided with a substantially rigid backing plate, also provided with a pattern and number of bores identical to those passing through the inner side of the saddle bag. Bolts are installed extending through bores in the backing plate, the sidewall, and the attachment portion. After mating nuts are threaded over the bolts and tightened, the installation is complete.

BRIEF DESCRIPTION OF THE DRAWINGS

FIG. 4 is an exploded rear perspective view, showing the strut, the fender bolt, and the adapter bracket;

FIG. 5 is fragmentary cross-sectional view, taken along the line 5-5, in FIG. 2;

FIG. 6 is an exploded fragmentary perspective view, showing the strut, the adapter bracket, the backing plate, and the saddle bag;

DETAILED DESCRIPTION OF THE PREFERRED EMBODIMENT

Figure 1:
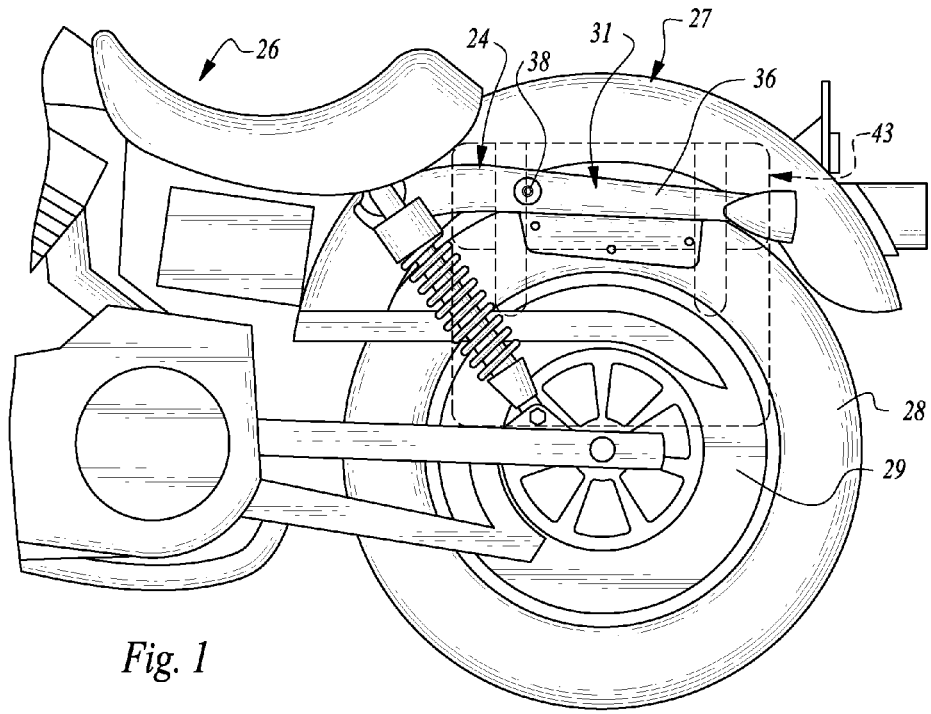
FIG. 1 is a fragmentary view of the rear portion of a motorcycle, showing the existing strut supporting the rear fender and the adapter bracket attached to the existing strut, the saddle bag being shown in broken line.

Turning now to the drawings, FIGS. 7-10 show a first embodiment of the adapter bracket 11 of the present invention. Adapter bracket 11 includes a lower attachment portion 12, an intermediate strut coupling portion 13, and a vertically extending upper connection plate 14. An aperture 16 is provided in the forward end of upper connection plate 14. A plurality of bores 17, is provided in lower attachment portion 12. Adapter bracket 11 is preferably made from stainless steel, or a similar material providing adequate strength and resilience to perform the bracket's task.

Strut coupling portion 13 has a horizontal upper side 18 interconnected to a lower end 19 of connection plate 14. Coupling portion 13 also has a horizontal lower side 21 interconnected to an upper end 22 of attachment portion 12. Upper side 18 and lower side 21 are arranged in generally spaced parallel relation, to define a coupling channel 23. Coupling channel 23 is sized and configured to engage a motorcycle rear fender strut 24, in a manner to be described below.

Figure 2:
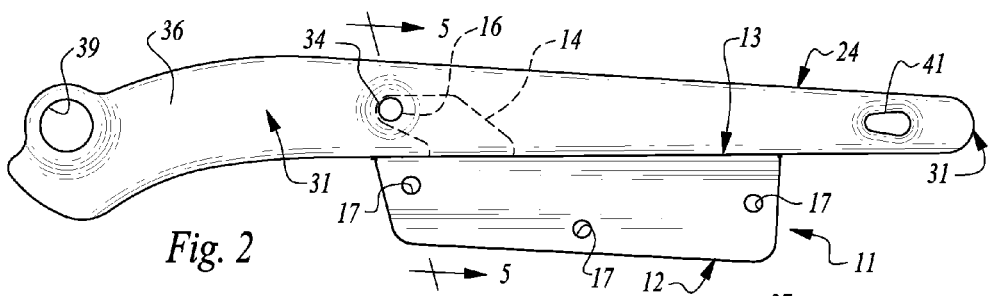
FIG. 2 is a side elevational view showing an existing strut with the adapter bracket attached thereto.

Making reference to FIGS. 1 and 2, the rear portion of a motorcycle 26 includes an elongated, horizontal fender strut 24, to maintain rear fender 27 securely in spaced relation above tire 28 and wheel 29. Strut 24 includes a vertical section 31, a lower horizontal section 32, and an upper horizontal section 33. Vertical section 31 has a bolt hole 34, extending through it from an outer face 36 to an inner face 37. A first fender bolt 38 is also provided, passing from outer face 36 of vertical section 31 through bolt hole 34, and then threadably engaging rear fender 27.

Strut 24 will also typically include a frame bolt hole 39, and a second fender bolt hole 41. A frame bolt, not shown in the drawings, secures the strut 24 to the frame of the motorcycle 26. A second fender bolt 42 secures the strut 24 and the fender 27 together [See, FIG. 6]. The strut 24 may also have special design and appearance characteristics, that vary with the taste of the owner and the design of the motorcycle. For example, it may have a front enlarged and curved portion and a tapering rear portion as shown in the drawings, and it may be chromed or painted for aesthetic appeal.

One of the important aspects of the adapter bracket 11 of the present invention, is that its installation does not require modification of the structure of the strut 24, or defacing the appearance of the strut 24, in any way. In fact, the adapter bracket 11 is installed to the strut 24 without drilling any holes in the strut 24, or in any other part of the motorcycle 26. To that end, the first step in installing the adapter bracket 11 simply involves unscrewing the first fender bolt 38 from the fender 27, and removing the bolt from the bolt hole 34.

Figure 3:
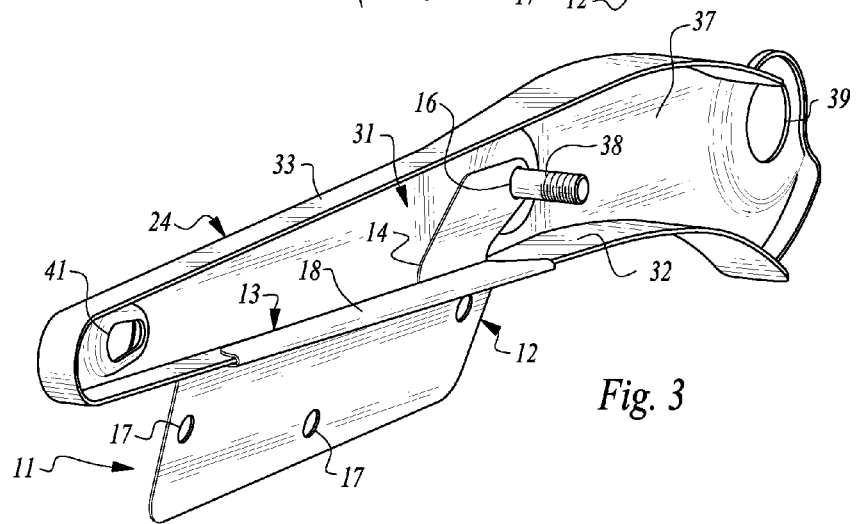
FIG. 3 is rear perspective view, taken from the inner side of the strut, showing the adapter bracket with its intermediate coupling portion over the lower section of the strut, and the aperture in the bracket's connection plate in alignment with the fender bolt.
Figure 7:
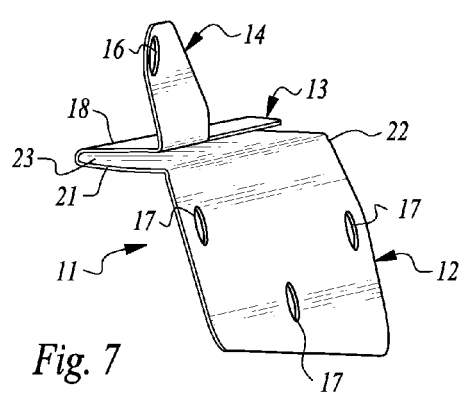
FIG. 7 is a front perspective view of an adapter bracket.
Figure 8:
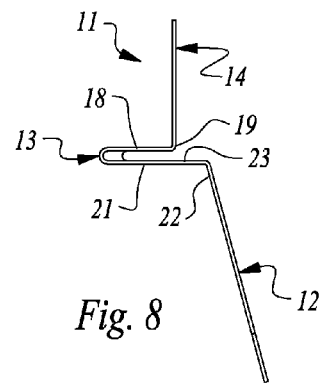
FIG. 8 is a front elevational view of the adapter bracket.
Figure 9:
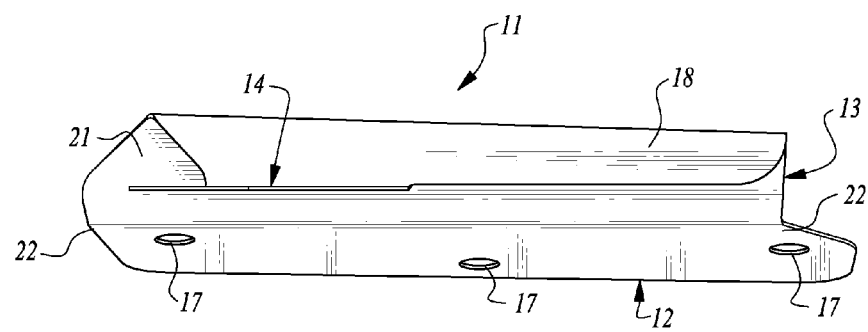
FIG. 9 is a top plan view of the adapter bracket.
Figure 10:
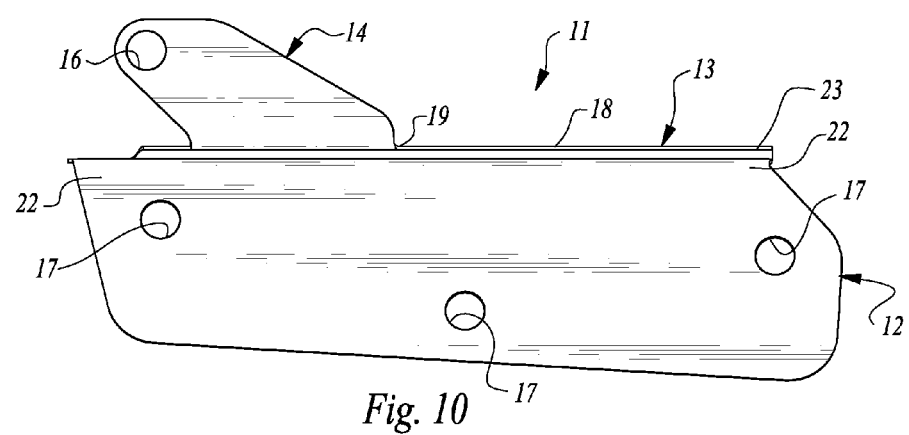
FIG. 10 is a side elevational view of the adapter bracket.
Figure 11:
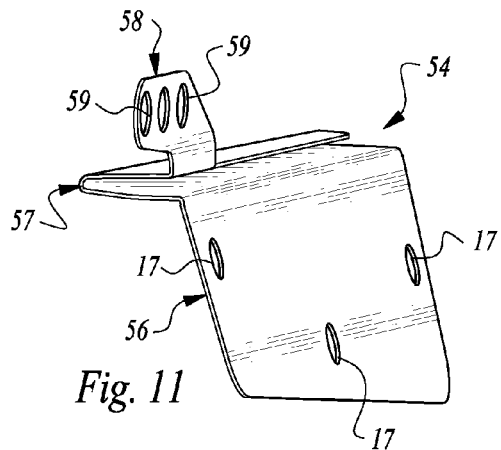
FIG. 11 is a front perspective view of an alternative embodiment of the adapter bracket.
Figure 12:
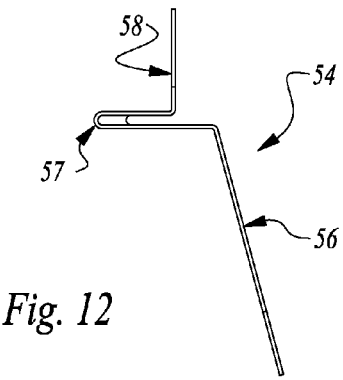
FIG. 12 is a front elevational view of the alternative embodiment of FIG. 11.
Figure 13:
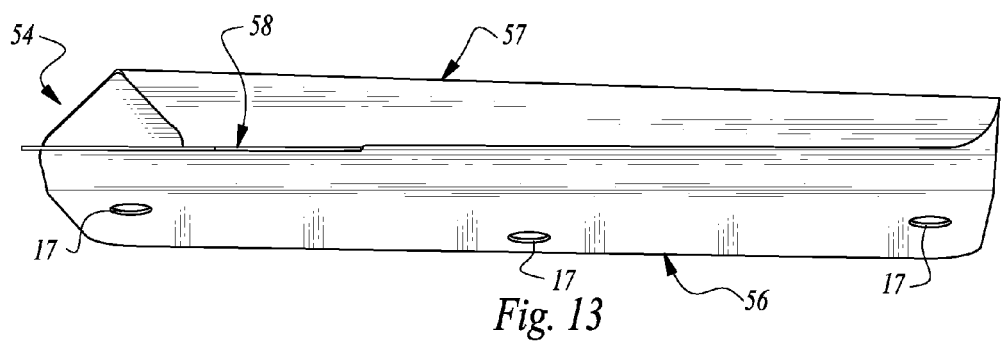
FIG. 13 is a top plan view of the alternative embodiment of FIG. 11.
Figure 14:
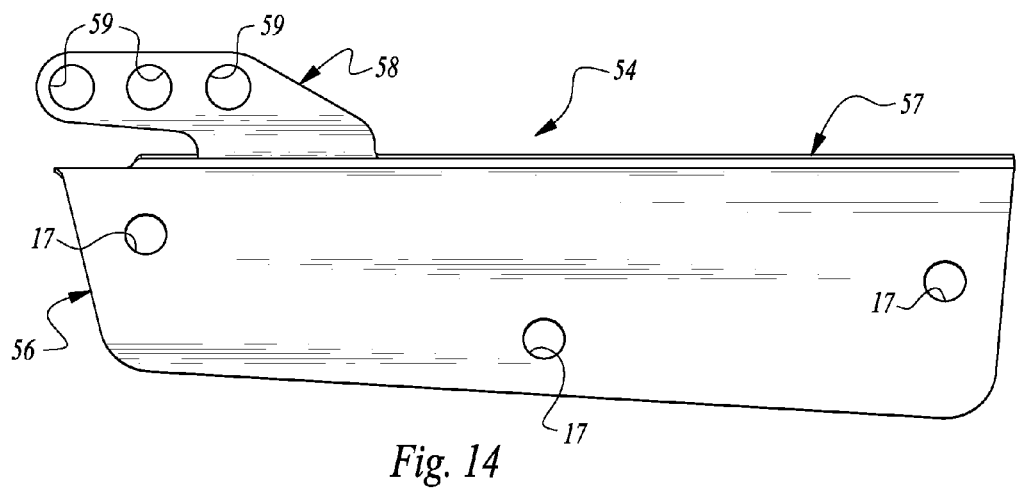
FIG. 14 is a side elevational view of the alternative embodiment of FIG. 11; and, FIG. 15 is a fragmentary side elevational view of the connection plate of another alternative embodiment, allowing slidable adjustment of the location of the adapter bracket.

The next step requires the installation of the adapter bracket 11 over the inner side of the strut 24. This step is most clearly shown in FIGS. 3, 4, and 5, where the strut coupling portion 13 is slid over the lower horizontal section 32 of strut 24. Since upper side 18 and lower side 21 of coupling portion 13 are appropriately sized and configured, a snug engagement with lower horizontal section 32 is provided.

The position of adapter bracket 11 along strut 24 is slidably adjusted so aperture 16 in the upper connection plate 14 is aligned with the bolt hole 34 in the vertical section 31 of strut 24. The next step requires that the first fender bolt 38 is inserted first through bolt hole 34 and then aperture 16 in the connection plate 14. Upon further insertion and rotation of the bolt 38, its threaded portion will threadably engage a threaded hole in the structure of motorcycle fender 27. At this stage, by tightening first fender bolt 38, the strut 24, the adapter bracket 11, and the rear fender 27 are securely bolted together.

The next step requires installation of the saddle bag 43, onto the lower attachment portion 12 of adapter bracket 11. Saddle bag 43 is of conventional design, including an inner sidewall 44 and an outer sidewall 46. Saddle bag 43 is fixed to attachment portion 12 preferably using a plurality of bolts 47, passing through bores 48 in the inner sidewall 44 and bores 17 in attachment portion 12. It is also desirable to provide a backing plate 49 with respective bores 51. Backing plate 49 prevents tearing or enlargement of bores 48 in inner sidewall 44, and distributes compressive forces provided by the bolts 47, over a relatively large area of sidewall 44. Bores 51 in backing plate 49 correspond in pattern and number with bores 48 in inner sidewall 44. As shown in FIG. 6, backing plate 49 is mounted against an inner side 52 of said inner sidewall 44, and bolts 47 are threadably secured against plate 49, sidewall 44, and attachment portion 12, by means of mating nuts 53.

It should be noted that attachment portion 12 is oriented at an angle downwardly and outwardly from an outer edge of the strut 24, so that the inner sidewall 44 of saddle bag 43 is supported in spaced relation from the rear wheel 29 of motorcycle 26. (See, FIGS. 1, 5, and 6). This downward and outward angle for the plane of attachment portion 12, coupled with the strength and resilience of the adapter bracket 11, maintain saddle bag 43 comfortably spaced from the rear wheel 29 and other motorcycle components, such as the belt guard.

A second embodiment of the adapter bracket is disclosed in FIGS. 11-14. Adapter bracket 54 may be used in a circumstance where the configuration of the particular strut is of lower profile, than strut 24 associated with the adaptive system just described. It may also be used where a degree of adjustment is desired, for the final position of the adapter bracket 54 and the attached saddle bag. In the description of the second embodiment of adapter bracket 54, identical numerical designations will be used to describe those identical elements previously described. In addition, since the installation and use of adapter bracket 54 is substantially identical to that just described, there is no necessity for repetition of that disclosure.

Adapter bracket 54 includes a lower attachment portion 56, an intermediate strut coupling portion 57, and a vertically extending upper connection plate 58. A plurality of apertures 59 is provided in upper connection plate 58. By selecting a particular aperture 59, the user is provided a certain amount of adjustment in the end location of adapter bracket 54 along the strut to which it is mounted. Relative fore or aft movement of the location of adapter bracket 54 can provide a better looking or better functioning position for the saddle bag 43 that is eventually mounted to the lower attachment portion 56. As previously described, a plurality of bores 17 is provided in lower attachment portion 56 for affixing the saddle bag 43.

Several other differences in adapter bracket 54 are worth noting. The profile of upper connection plate 58 is different than that of upper connection plate 14. Connection plate 58 is lower in profile, and more forwardly extending compared to adapter bracket 54. This is to accommodate a rear fender strut having a lower height. The relative forward extension of connection plate 14 is to accommodate a strut having a first fender bolt hole in a more forward position, than that for the motorcycle 26 described above.

Similarly, the size and configuration of strut coupling portion 57 and lower attachment portion 56 are slightly different in adapter bracket 54, to accommodate a different strut and a different location for the saddle bag along that strut. Since different makes and models of motorcycles may have different sizes and configurations for their rear fender struts, the required modifications and adjustments must be made to the bracket. However, such modifications and adjustments are well within the capabilities of one of ordinary skill in the art.

Figure 15:
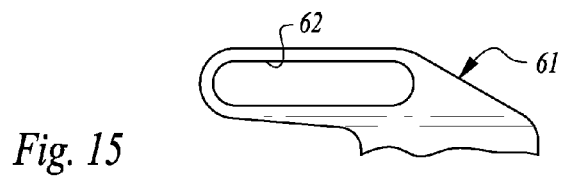

Lastly, a modified upper connection plate 61 is shown in FIG. 15. Connection plate 61 may be substituted in lieu of connection plate 14 or connection plate 58, of previously described embodiments of adapter brackets. Connection plate 61 includes an elongated slot aperture 62, for adjustable location of the adapter bracket along an associated rear fender strut. Rather than having a single bolt hole, or a plurality of bolt holes, the slot aperture provides an enhanced degree of adjustability for the location of the adapter bracket. In all other respects, use of an adapter bracket employing a connection plate 61, is identical to that previously described.

What is claimed is:

1. An adaptive system for supporting a saddle bag on a motorcycle, comprising in combination:
   a. an elongated horizontal fender strut having a vertical section extending between a lower horizontal section and an upper horizontal section, said vertical section having a fender bolt hole extending through it;
   b. an adapter bracket including a lower attachment portion, an intermediate strut coupling portion, and a vertically extending upper connection plate provided with an aperture, said strut coupling portion having a horizontal upper side interconnected to a lower end of said connection plate and a horizontal lower side interconnected to an upper end of said attachment portion, said upper side and said lower side being arranged in generally spaced parallel relation to define a coupling channel, said coupling channel being sized and configured to engage and substantially surround an upper face and a lower face of said lower horizontal section of said strut with said aperture in said connection plate being aligned with said bolt hole in said vertical section of said strut;
   c. a first fender bolt, said first fender bolt passing from an outer face of said vertical section through said fender bolt hole and said aperture in said adapter bracket, and then threadably engaging a motorcycle fender, said first fender bolt securing said upper connection plate of said adapter bracket between an inner face of said vertical section and said motorcycle fender; and,
   d. a saddle bag, said saddle bag having an inner sidewall proximate the motorcycle fender and an outer sidewall remote from the motorcycle fender, said inner sidewall being fixed to said lower attachment portion of said adapter bracket.

2. An adaptive system as in claim 1 in which said saddle bag is fixed to said lower attachment portion using a plurality of bolts, extending through bores in said inner sidewall and said attachment portion.

3. An adaptive system as in claim 2 further including a backing plate with bores corresponding in location and number with said bores in said inner sidewall, said backing plate being mounted against an inner side of said inner sidewall and being secured by said plurality of bolts.

4. An adaptive system as in claim 1 in which said strut has a forward end attached to a frame portion of the motorcycle, and in which said strut has a rearward end including a bolt hole through which a second fender bolt passes threadably to engage the motorcycle fender.

5. An adaptive system as in claim 1 in which said attachment portion is oriented at an angle downwardly and outwardly from said fender strut, so that said inner sidewall of said saddle bag is supported in spaced relation from a rear wheel of the motorcycle and other motorcycle components.

6. An adaptive system as in claim 1 including a plurality of apertures in said upper connection plate, for adjustably mounting said adapter bracket through a selected one of said plurality of apertures.

7. An adapter bracket and saddle bag for use with a motorcycle having a rear fender bolted to a rear fender strut, comprising in combination:
   a. an adapter bracket including a lower attachment portion, an intermediate strut coupling portion, and a vertically extending upper connection plate provided with an aperture, said strut coupling portion having a horizontal upper side interconnected to a lower end of said connection plate and a horizontal lower side interconnected to an upper end of said attachment portion, said upper side and said lower side being arranged in generally spaced parallel relation to define a coupling channel, said coupling channel being sized and configured to engage and substantially surround an upper face and a lower face of a horizontal section of the rear fender strut with said aperture in said connection plate being aligned with an existing bolt hole in a vertical section of the rear fender strut for passage of a rear fender bolt; and,
   b. a saddle bag, said saddle bag having an inner sidewall proximate the rear fender of the motorcycle and an outer sidewall remote from the rear fender, said inner sidewall being fixed to said attachment portion of said adapter bracket.

8. An adapter bracket and saddle bag as in claim 7, further including a first rear fender bolt, said first rear fender bolt first passing from an outer face of the vertical section of the strut through the existing bolt hole and said aperture, and then threadably engaging the rear motorcycle fender, said first rear fender bolt securing said upper connection plate of said adapter bracket between an inner face of the vertical section and the rear motorcycle fender.

9. An adapter bracket and saddle bag as in claim 7 in which said saddle bag is fixed to said attachment portion using a plurality of bolts, extending through bores in said inner sidewall and said attachment portion.

10. An adapter bracket and saddle bag as in claim 9 further including a backing plate with bores corresponding in location and number with said bores in said inner sidewall, said backing plate being mounted against an inner side of said inner sidewall and being secured by said plurality of bolts.

11. An adapter bracket and saddle bag as in claim 7 in which said attachment portion is oriented at an angle downwardly and outwardly from the strut, so that said inner sidewall of said saddle bag is supported in spaced relation from a rear wheel of the motorcycle and other motorcycle components.

12. An adapter bracket and saddle bag as in claim 7 including a plurality of apertures in said upper connection plate, for adjustably mounting said adapter bracket through a selected one of said plurality of apertures.

13. An adapter bracket and saddle bag as in claim 7 including a slot aperture in said upper connection plate, for adjustably mounting said adapter bracket through a selected position along said slot.

\* \* \* \* \*